T. J. BARROW.
UNDER TREE PLOW.
APPLICATION FILED MAY 11, 1921.

1,419,102.

Patented June 6, 1922.

THADDEUS J. BARROW INVENTOR.

BY *Hazard & Miller*
ATTORNEYS.

UNITED STATES PATENT OFFICE.

THADDEUS J. BARROW, OF RIVERSIDE, CALIFORNIA.

UNDER-TREE PLOW.

1,419,102.   Specification of Letters Patent.   Patented June 6, 1922.

Application filed May 11, 1921. Serial No. 468,694.

*To all whom it may concern:*

Be it known that I, THADDEUS J. BARROW, a citizen of the United States, residing at Riverside, in the county of Riverside and State of California, have invented new and useful Improvements in Under-Tree Plows, of which the following is a specification.

This invention relates to plows or other earth working implements so arranged as to be readily drawn through an orchard, or the like, while permitting of operation of the implement beneath the trees without the frame of the implement striking the trees so as to injure the same.

The improved construction includes a vehicle frame having a laterally offset earth engaging element, and a draft means for the vehicle so constructed as to cause the implement to move in a straight line irrespective of the side draft caused by the offset earth engaging element.

The invention also contemplates the provision of a suitable guard arrangement upon the vehicle at the side thereof which is adjacent the trees underneath which the implement functions, said guard arrangement being so constructed as to lift the branches of the trees out of the way and to prevent the implement striking the trees so as to injure the same.

The invention will be readily understoood from the following description of the accompanying drawings, in which.

Figure 1:
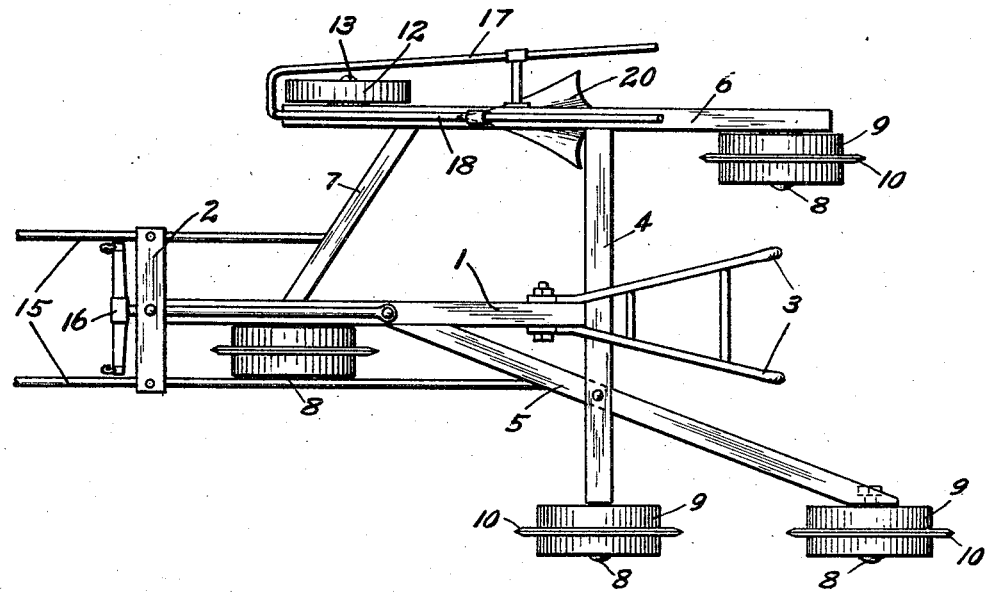
Figure 1 is a plan view of an implement constructed in accordance with the invention.
Figure 2:
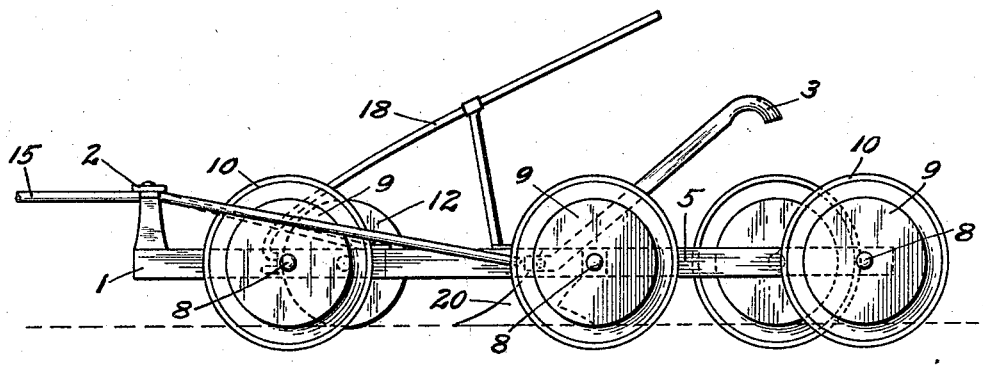
Fig. 2 is a side elevation of the same.

The frame of the implement may include longitudinally extending bar 1 at the line of draft of the implement and preferably carrying a cross bar 2 at its forward end, and suitable handles 3 at the rear end of the same. The rear end of bar 1 is also connected to a cross bar 4, and an angularly disposed bar 5 is preferably connected to bars 1 and 4 so as to extend rearwardly with relation to bar 4 until its end is in longitudinal alinement with the end of the cross bar 4. The opposite end of cross bar 4 supports a longitudinally extending bar 6, and a brace 7 preferably extends from bar 4 to bar 1.

The frame, as thus described, is supported by wheels carried upon fixed axles and illustrated as including axles 8 arranged at the ends of bars 4 and 5 at one side of the implement, upon bar 1 at the line of draft of the implement, and upon the rear portion of bar 6 at the opposite side of the implement. Traction wheels 9 are mounted upon the axles and are shown as provided with relatively wide tread surfaces and with circumferentially extending and radially projecting ribs 10 adapted to cut into the ground and thereby tend to keep the implement in a straight line. The forward end of bar 6 is preferably supported by the wheel 12 upon axle 13.

The implement, as thus described, is preferably drawn by a single draft animal, and the shafts for the same are so arranged as to tend to hold the animal in a straight line so as to prevent swerving of the implement. The shafts of the implement are shown at 15 as rods projecting forwardly from cross bar 2 and preferably also continued rearwardly beyond said cross bar so as to be connected to the bar 5 and to brace 7 respectively. A usual whiffletree 16 is arranged between the shafts.

It will be noted that the construction, as thus described provides for the implement being drawn between the rows of trees of an orchard by a draft animal, while the lateral extension at one side of the implement and including the bar 6 will move beneath the branches of a row of trees and adjacent the tree trunks. Means are preferably provided for preventing the implement striking the tree trunks and for also brushing the lowermost branches of the trees out of the way of the implement. For this purpose guard rods 17 and 18 may extend rearwardly from the forward end of bar 6 and outwardly and upwardly with relation to the same respectively.

The bar 6 of the implement carries the earth engaging element thereof, and in the present instance the earth engaging element is shown as a plow 20 depending from bar 6. It will be obvious, however, that the implement may form a cultivator, or any other type of earth working implement, which it is desired to employ in an orchard or the like.

The implement, as thus constructed, may be readily drawn in a straight line through an orchard without danger of the same swerving so as to strike the trees, since although there is a tendency of the earth engaging element to create a side draft and thereby swing the implement from is course, this tendency is overcome by the ribs provided upon traction wheels 9, and which will tend to maintain the implement in a straight course, and any swerving tendency of the implement is further overcome by the positioning of the draft animal in rigid shafts so as to eliminate the possibility of turning movement of the animal.

Various changes may be made without departing from the spirit of the invention as claimed.

What is claimed is:

1. In an under tree plow, a pair of parallel beams, one of which is arranged slightly in advance of the other, a transverse beam connected to the rear portion of the forward beam, and to the intermediate portion of the other beam, a diagonally disposed beam connected to and extending outwardly and rearwardly from the forward beam, and ribbed wheels journaled upon the parallel beams, the transversely disposed beam and the inclined beam.

2. In an under tree plow, a pair of parallel beams, one of which is arranged slightly in advance of the other, a transverse beam connected to the rear portion of the forward beam, and to the intermediate portion of the other beam, a diagonally disposed beam connected to and extending outwardly and rearwardly from the forward beam, ribbed wheels journaled upon the parallel beams, the transversely disposed beam and the inclined beam, and a plow carried by one of the parallel beams.

3. In an under tree plow, a pair of parallel beams, one of which is arranged slightly in advance of the other, a transverse beam connected to the rear portion of the forward beam and to the intermediate portion of the other beam, a diagonally disposed beam connected to and extending outwardly and rearwardly from the forward beam, ribbed wheels journaled upon the parallel beams, the transversely disposed beam and the inclined beam, plow handles projecting upwardly and rearwardly from the advance parallel beam, and a plow depending from the intermediate portion of the other parallel beam.

4. In an under tree plow, a frame comprising a pair of substantially parallel beams, a transverse beam connected to the rear portion of one of said parallel beams with the intermediate portion of the other beam, an inclined beam projecting rearwardly and outwardly from one of said parallel beams, flanged wheels journaled on said beams, plow handles projecting rearwardly from the central portion of said frame, and a plow carried by one of the beams at the side of the said frame.

In testimony whereof I have signed my name to this specification.

THADDEUS J. BARROW.